(12) United States Patent
Tremelling et al.

(10) Patent No.: US 12,398,829 B2
(45) Date of Patent: Aug. 26, 2025

(54) MOLDED CONDUIT PENETRATION SEAL

(71) Applicant: ABB SCHWEIZ AG, Baden (CH)

(72) Inventors: Darren Tremelling, Raleigh, NC (US);
Sheng Zhong, Raleigh, NC (US);
Matthew Hetrich, Raleigh, NC (US)

(73) Assignee: ABB SCHWEIZ AG, Baden (CH)

( * ) Notice: Subject to any disclaimer, the term of this patent is extended or adjusted under 35 U.S.C. 154(b) by 298 days.

(21) Appl. No.: 17/508,868

(22) Filed: Oct. 22, 2021

(65) Prior Publication Data
US 2023/0130934 A1 Apr. 27, 2023

(51) Int. Cl.
F16L 5/06 (2006.01)

(52) U.S. Cl.
CPC ...................... F16L 5/06 (2013.01)

(58) Field of Classification Search
CPC ........................................................ F16L 5/06
See application file for complete search history.

(56) References Cited

U.S. PATENT DOCUMENTS

| | | | | |
|---|---|---|---|---|
| 3,125,358 A * | 3/1964 | Kleinberg | .................. | F16L 5/06 |
| 3,181,899 A * | 5/1965 | McKnight, Jr. | .......... | F16L 41/14 |
| 3,643,987 A * | 2/1972 | DuPont | .................. | F16L 37/008 |
| 4,983,784 A | 1/1991 | Whitlock | | |
| 5,971,444 A | 10/1999 | Hawkins | | |
| 2004/0094951 A1* | 5/2004 | Sigrist | ........................ | F16L 5/06 |
| 2008/0116319 A1* | 5/2008 | Negley | ..................... | F16L 5/06 |
| 2010/0218992 A1 | 9/2010 | Smith | | |
| 2011/0042935 A1* | 2/2011 | Bain | .......................... | F16L 5/06 |
| 2012/0224933 A1* | 9/2012 | Anderson | ................. | F16L 5/06 |
| 2017/0211724 A1* | 7/2017 | Böcker | ...................... | F16L 5/06 |
| 2020/0303914 A1 | 9/2020 | Drane et al. | | |
| 2023/0378729 A1* | 11/2023 | Lechner | ............. | H01R 13/5205 |

FOREIGN PATENT DOCUMENTS

| | | | | |
|---|---|---|---|---|
| DE | 44642 A1 | 3/1966 | | |
| FR | 2932201 A1 * | 12/2009 | ................ | F16L 5/06 |
| JP | S54 109118 U | 8/1979 | | |
| JP | S54109118 B2 | 8/1979 | | |
| KR | 20090082658 A | 7/2009 | | |

* cited by examiner

Primary Examiner — Zachary T Dragicevich
(74) Attorney, Agent, or Firm — Greenberg Traurig, LLP

(57) ABSTRACT

A conduit seal that serves to connect conduits between different environments while providing sufficient insulation to mitigate condensation and molding issues. The conduit seal can also provide grounding continuity with an electrical conducting insert, thereby providing electrical continuity across a thermal barrier between the environments. The conduit seal includes a through-hole connector including a body, a first end, and a second end, a compliant member, and a locking member. The body has an exterior surface, and the body defines an internal cavity. The compliant member is disposed circumferentially around the exterior surface of the through-hole connector. The compliant member is connected to the locking member and is configured to seal the locking member to a barrier.

19 Claims, 6 Drawing Sheets

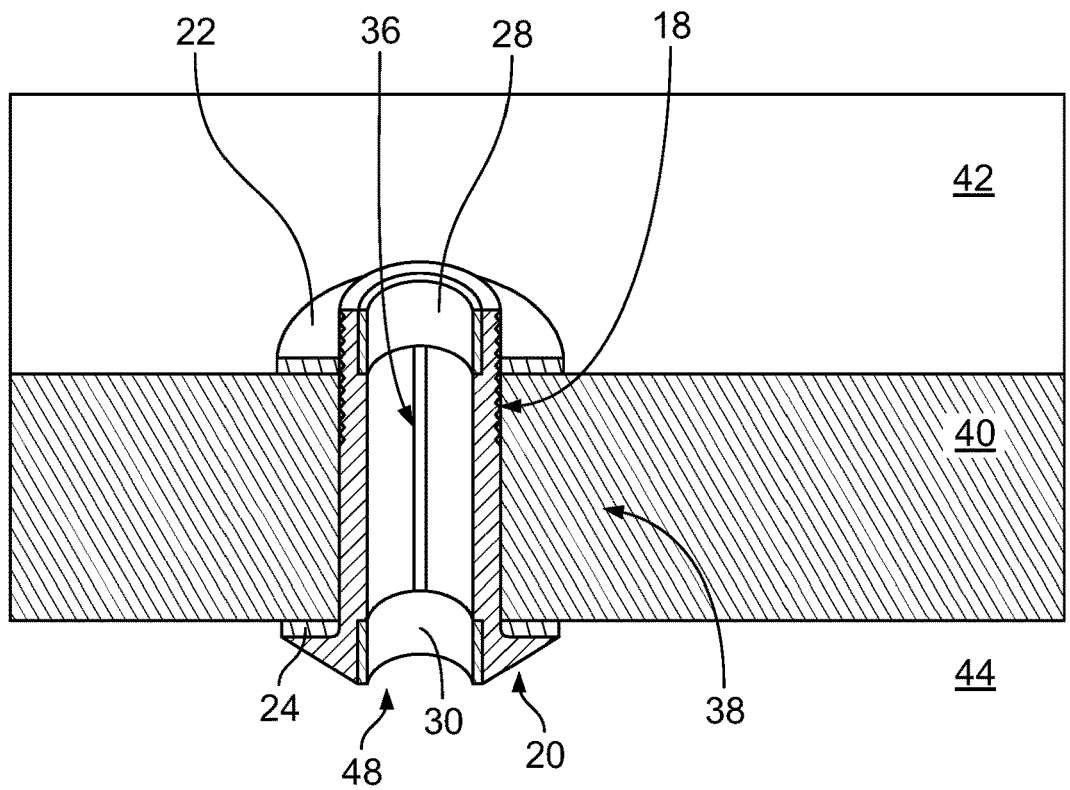

┌─ 102 ─────────────────────────────────────────────────┐
│ Insert a First End of a Through-hole Connector through a │
│ Barrier to a First Side of the Barrier                   │
└──────────────────────────────────────────────────────────┘
                          │
                          ▼
┌─ 104 ─────────────────────────────────────────────────┐
│ Maintain a Flange Connected to a Second End of the       │
│ Through-hole Connector on a Second Side of the Barrier   │
└──────────────────────────────────────────────────────────┘
                          │
                          ▼
┌─ 106 ─────────────────────────────────────────────────┐
│ Seal the Through-hole Connector to the Barrier by Connecting a │
│ First Washer Connected to a Locking Cap to the First Side of the │
│ Barrier and by Connecting a Second Washer Connected      │
│ to the Flange to the Second Side of the Barrier          │
└──────────────────────────────────────────────────────────┘

FIG. 4

MOLDED CONDUIT PENETRATION SEAL

FIELD

This disclosure relates generally to a conduit seal extending between two environments. More particularly, this disclosure relates to a conduit seal extending between two environments, which reduces thermal conductivity while optionally maintaining electrical continuity.

BACKGROUND

In certain industries, a conduit assembly is desired to extend between two different places.

SUMMARY

In some embodiments, a conduit seal comprises a through-hole connector, wherein the through-hole connector includes a body, wherein the body has an exterior surface, wherein the body defines an internal cavity, a first end, and a second end, wherein the second end is longitudinally opposite the first end; a compliant member, wherein the compliant member is disposed circumferentially around the exterior surface of the through-hole connector; and a locking member, wherein the compliant member is connected to the locking member and is configured to seal the locking member to a barrier.

In some embodiments, the conduit seal further comprises a second compliant member, wherein the second compliant member is disposed circumferentially around the exterior surface of the through-hole connector.

In some embodiments of the conduit seal, the second end of the through-hole connector comprises a flange, and the second compliant member is connected to the flange and is configured to seal the flange to the barrier.

In some embodiments, the conduit seal further comprises at least one electrical conducting insert, wherein the at least one electrical conducting insert extends longitudinally within the internal cavity along the through-hole connector to electrically connect the first end of the through-hole connector to the second end of the through-hole connector.

In some embodiments of the conduit seal, the at least one electrical conducting insert comprises a first interface member connected to the first end of the through-hole connector; a second interface member connected to the second end of the through-hole connector; and a conducting member electrically connecting the first interface member to the second interface member.

In some embodiments of the conduit seal, the first interface member has a first threaded portion and the second interface member has a second threaded portion, wherein the first threaded portion of the first interface member is configured to be connected to a first, separate conduit, and wherein the second threaded portion of the second interface member is configured to be connected to a second, separate conduit.

In some embodiments of the conduit seal, the first interface member and the second interface member comprise a metallic material.

In some embodiments of the conduit seal, the conducting member comprises copper, aluminum, or stainless steel.

In some embodiments of the conduit seal, the compliant member and the second compliant member are elastomeric.

In some embodiments of the conduit seal, the compliant member and the second compliant member comprise polyisoprene, polybutadiene (butadiene rubber), styrene-butadiene rubber, acrylonitrile-butadiene copolymer, isobutylene-isoprene copolymer, ethylene-propylene copolymer, polychloroprene, polysulfide, silicones (e.g., polydimethylsiloxane), polyurethane, polyacrylate elastomer, chlorinated polyethylene, styrene-isoprene-styrene copolymer (SIS), styrene-butadiene-styrene copolymer (SBS), ethylene-propylene-diene polymer, fluoroelastomers (e.g., tetrafluoroethylene propylene, fluorosilicone, and perfluoroelastomer), or any combination thereof.

In some embodiments of the conduit seal, the through-hole connector is injection molded, compression molded, transfer molded, or potted.

In some embodiments of the conduit seal, the through-hole connector comprises a thermoplastic or a thermoset resin.

In some embodiments of the conduit seal, the through-hole connector comprises an additive of ultra-violet (UV) resistance, antimicrobial, conductivity, mechanical and thermal stability, chemical resistance, insulation property or decreased flammability.

In some embodiments of the conduit seal, a thermal conductivity of the through-hole connector ranges from about 0.2 Watt per meter-Kelvin to about 5 Watt per meter-Kelvin.

In some embodiments, a method of securing a conduit seal to a barrier comprises inserting a first end of a through-hole connector through the barrier to a first side of the barrier; maintaining a flange connected to a second end of the through-hole connector on a second side of the barrier; sealing the through-hole connector to the barrier by connecting a first compliant member connected to a locking member to the first side of the barrier and connecting a second compliant member connected to the flange to the second side of the barrier.

In some embodiments of the method of securing the conduit seal to the barrier, the barrier is a floor in a building, and wherein the first side of the barrier is located vertically above the second side of the barrier.

In some embodiments of the method of securing the conduit seal to the barrier, the barrier is a floor in a building, and wherein the second side of the barrier is located vertically above the first side of the barrier.

In some embodiments of the method of securing the conduit seal to the barrier, the barrier is a wall in a building.

In some embodiments of the method of securing the conduit seal to the barrier, the locking member has a threaded interior surface and the first end of the through-hole connector has a threaded exterior surface, wherein the threaded interior surface of the locking member and the threaded exterior surface of the first end of the through-hole connector are reciprocally threaded, and wherein the connecting the first compliant member to the first side of the barrier comprises screwing the threaded interior surface of the locking member onto the threaded exterior surface of the first end of the through-hole connector.

In some embodiments, the method of securing the conduit seal to the barrier further comprises connecting a first conduit to a first end of the conduit seal.

In some embodiments, the method of securing the conduit seal to the barrier further comprises connecting a second conduit to a second end of the conduit seal.

BRIEF DESCRIPTION OF THE DRAWINGS

References are made to the accompanying drawings that form a part of this disclosure and that illustrate embodiments in which the systems and methods described in this Specification can be practiced.

FIG. 3 shows a conduit seal according to some of the embodiments.

FIG. 4 shows an exemplary flowchart according to some of the embodiments for securing a conduit seal to a barrier.

Like reference numbers represent the same or similar parts throughout.

DETAILED DESCRIPTION

Figure 1A:
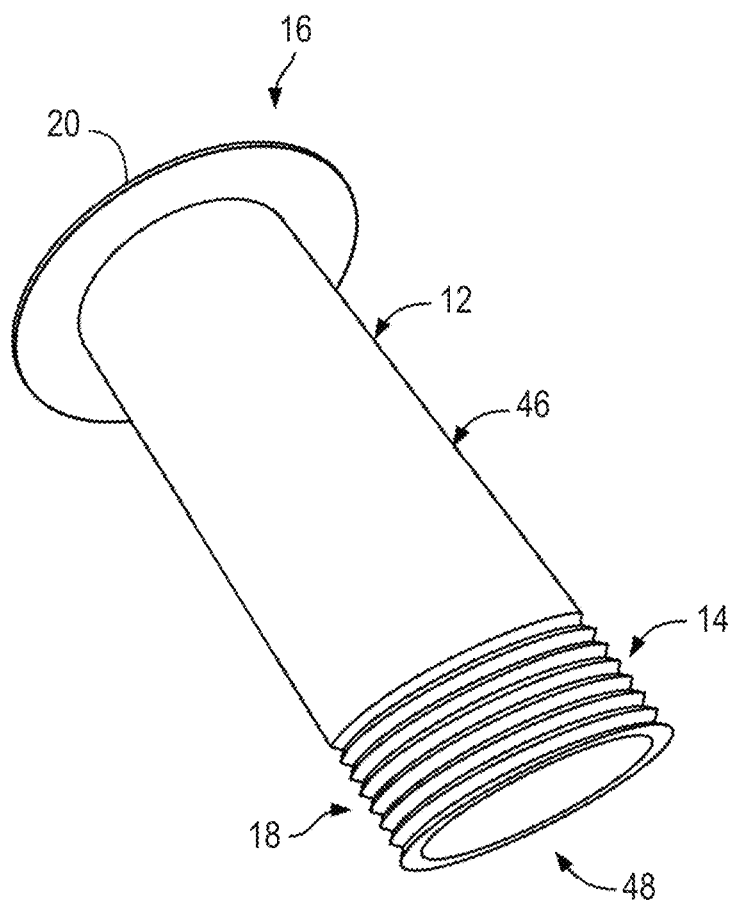
FIG. 1A-1F show an exemplary conduit seal according to some of the embodiments.
Figure 1B:
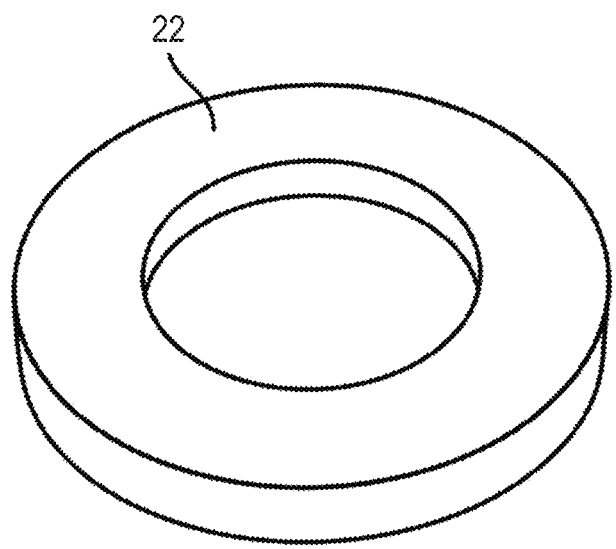
Figure 1C:
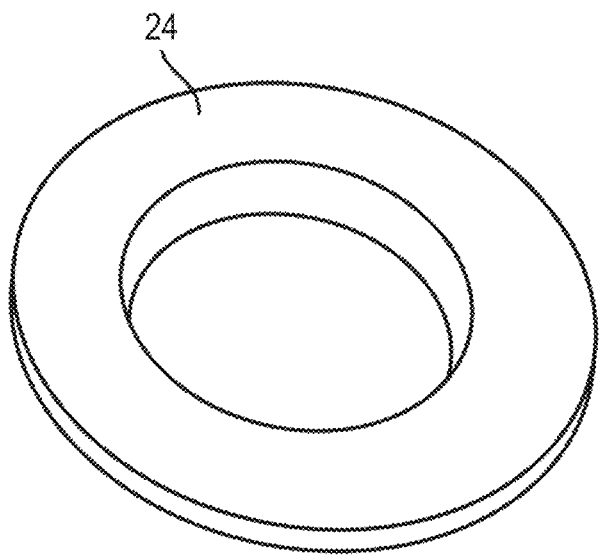
Figure 1D:
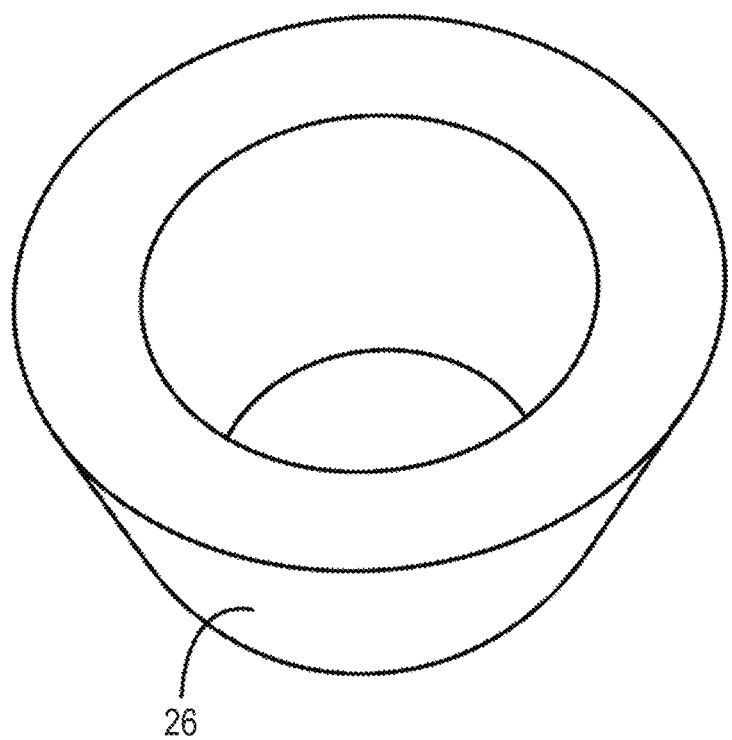
Figure 1E:
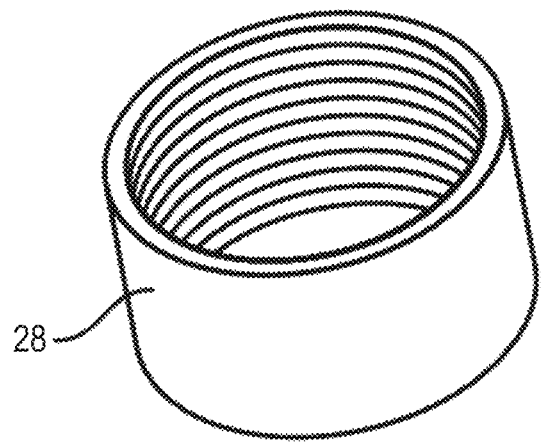
Figure 1F:
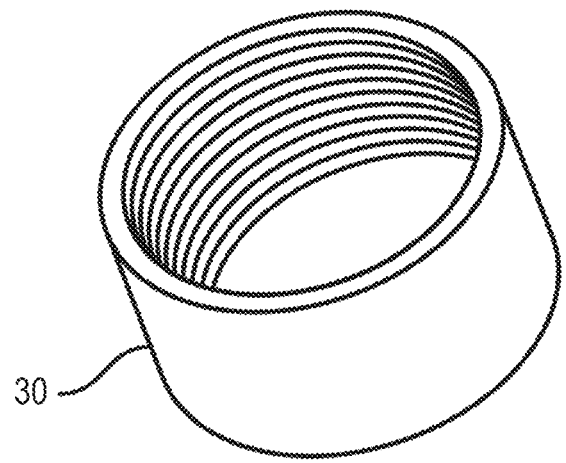

When conduits extend continuously across a change in environment, there can be a heat leak or gain. The change in environment can increase heating, venting, and air conditioning (HVAC) requirements and also present an issue of unwanted condensation. One example is where the conduit penetrates through an insulation wall from a cold environment to the relatively warm side. Without wishing to be bound by theory, the conduit surface is cold due to conductive heat transfer from the colder side of the conduit. The cool surface then condenses water in the warmer environment. The wet surface then provides an opportunity for mold or bacteria to grow. To block moisture penetration and mitigate cooling effect, users will often fill the void between the conduit and the through hole with flexible polymer caulking. This seal, however, will often loosen with time, increasing convection or passage of other contaminants (bugs).

One of the currently employed solutions involves a continuous conduit and use of an elastomer to fill the gap between conduit and structure. In some examples, a polyvinyl chloride (PVC) nipple has been employed to provide a thermal barrier between sides. However, the PVC nipple does not provide grounding continuity (between commonly used metallic conduit systems) and does not provide a reliable sealing along the conduit outer diameter (OD) and structure.

The present disclosure describes a conduit seal that serves as the connection of conduits between different environments (such as different temperature and relative humidity) while providing sufficient insulation to mitigate condensation and molding issues. This hygienic design helps eliminate germination and contamination. The conduit seal can also provide grounding continuity with an electrical conducting insert, thereby providing electrical continuity across the thermal barrier between the environments. The present disclosure can be used in a variety of applications including the food and beverage industry (F&B) and the pharmaceutical industry. More generally, the present disclosure may be used where a conduit passes between environments of different temperatures or other conditions. For example, one exemplary application is when a conduit passes from an interior space to an exterior space. Segments to be of commercial interest include F&B and commercial/industrial buildings, such as between interior and exterior spaces.

FIGS. 1A-1F shows an exemplary conduit seal according to some of the embodiments. Collectively referring to FIGS. 1A-1F, the conduit seal 10 is shown with the individual components not assembled, including a through-hole connector 12 with a body 46 extending from a first end 14 to a second end 16, the first end 14 having a connecting means 18 and the second end 16 having a flange 20. The body 46 has an exterior surface, and the body 46 defines an internal cavity 48. The second end 16 is longitudinally opposite the first end 14. The conduit seal 10 further includes a first compliant member 22, a second compliant member 24, a locking member 26, a first interface member 28, and a second interface member 30. FIGS. 1A-1F do not show a conducting member 36, which can be seen in the cross-sectional view of the conduit seal 10 in FIG. 3. The first interface member 28, the second interface member 30, and the conducting member 36 are collectively referred to as an electrical conducting insert 38.

The first compliant member 22 and the second compliant member 24 are disposed circumferentially around the exterior surface of the through-hole connector 12. In some embodiments, the conduit seal 10 includes the first compliant member 22 and the second compliant member 24. In some embodiments, the conduit seal 10 includes either the first compliant member 22 or the second compliant member 24, but not both the first compliant member 22 and the second compliant member 24. The first compliant member 22 and the second compliant member 24 can be separate and distinct components. Alternatively, the first compliant member 22 and/or the second compliant member 24 can be made integral with another component of the conduit seal 10. For example, the first compliant member 22 and the locking member 26 can be made as one integral component. Similarly, the second compliant member 24 and the flange 20 can be made as one integral component. When the second compliant member 24 and the flange 20 are not one integral component, the second compliant member 24 is connected to the flange 20. The second compliant member 24 is configured to seal the flange 20 to a barrier (such as a barrier 40 shown in FIG. 3). There are advantages and disadvantages for having the first compliant member 22 and the second compliant member 24 as an integral or separate component of the conduit seal 10. When the first compliant member 22 and the second compliant member 24 are integral with another component of the conduit seal 10, some of the benefits include a compact form factor (ease of shipment and installation) for the conduit seal 10. The compact form factor provides a distributor-friendly product. When the first compliant member 22 and the second compliant member 24 are not integral (i.e., separate and distinct) with another component of the conduit seal 10, some of the benefits include the increased ability to use varied materials according to application requirements.

The locking member 26 interfaces the with the through-hole connector 12 via the connecting means 18. The locking member 26 can be made of the same material as the through-hole connector 12. The locking member 26 and the first compliant member 22, whether or not they are integral, are configured to seal the locking member to a barrier (such as a barrier 40 shown in FIG. 3). The locking member 26 and the first compliant member 22 can be connected to one another and configured to provide superior seal performance on a first side of a barrier (such as a first side 42 of the barrier 40 as shown in FIG. 3). The locking member 26 can be a variety of forms depending on the connecting means 18. For example, if the connecting means 18 is a threaded interface, the locking member 26 can be a flange with a reciprocally threaded interface.

The connecting means 18 can use a variety of means to connect the through-hole connector 12 to the locking member 26 including a threaded interface, mechanical fastener, clearance fit (such as bolt/shaft holes), interference fit (i.e., press fit or friction fit), transition fit (i.e., slip or push fit), or snap-fit (such as a spherical snap-fit, ball bearing snap-fit, slotted snap-fit, torsion snap joint, annular snap joint or cantilevered lug snap-fit). Set screw and compression are types of connecting means 18 that can be used for in a variety of applications, including electrical metal tubing (EMT). This list is not meant to be exhaustive and is only exemplary. The connecting means 18 can be threaded to allow for variation in a length that the conduit seal 10 needs to penetrate through a barrier (similar to a barrier 40 in FIG. 3) and for fixation to a structure, such as a barrier.

Figure 2:
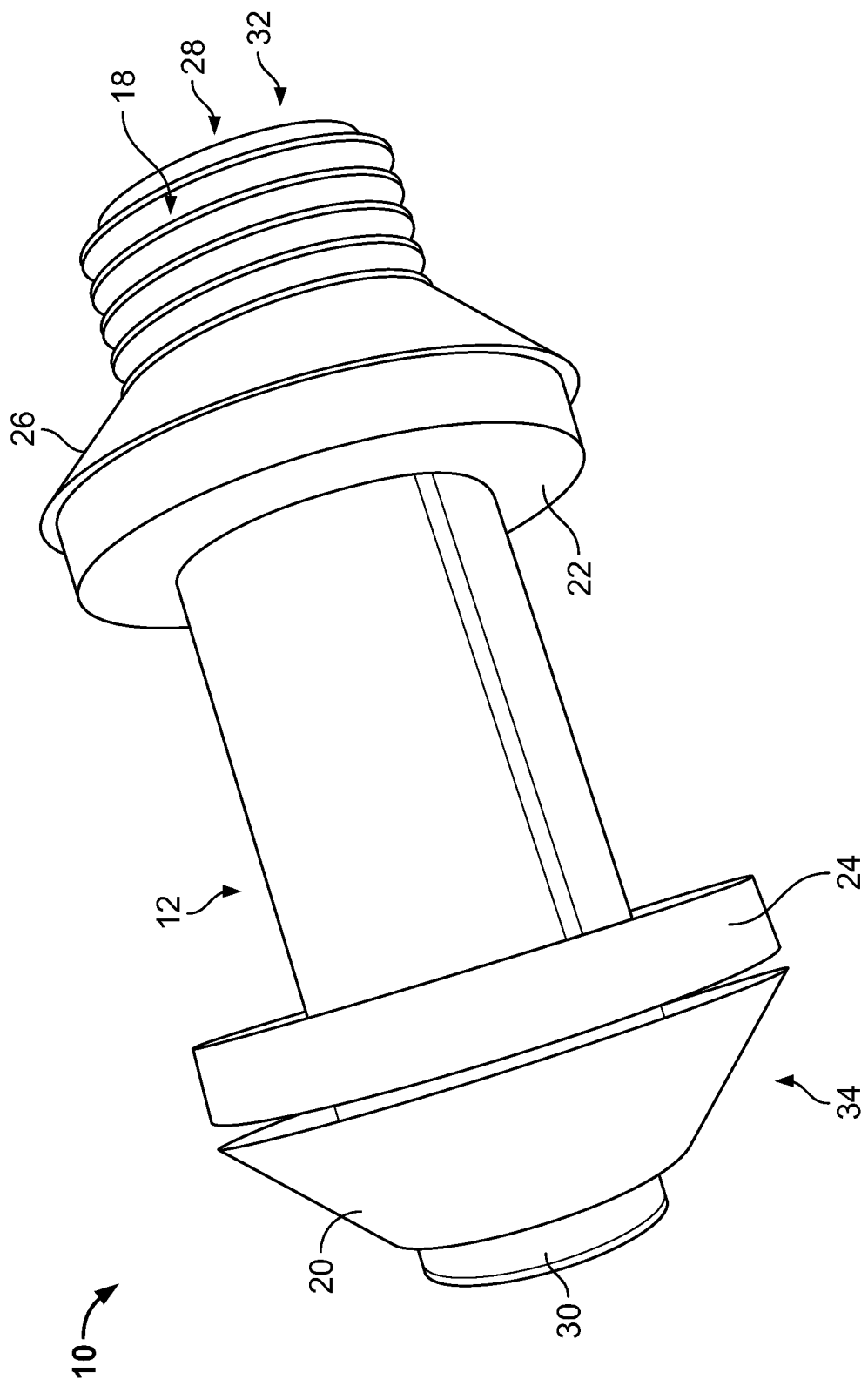
FIG. 2 shows an exemplary conduit seal according to some of the embodiments.

FIG. 2 shows the conduit seal 10 according to some of the embodiments. FIG. 2 shows the conduit seal 10 of FIGS. 1A-1F fully assembled. Accordingly, similar reference numbers are used. Not shown in FIG. 2 is a barrier (similar to a barrier 40 in FIG. 3) between the first compliant member 22 and the second compliant member 24. FIG. 2 shows a first end 32 of the conduit seal 10 and a second end 34 of the conduit seal 10.

FIG. 3 shows the conduit seal 10 according to some of the embodiments. FIG. 3 shows an embodiment for the conduit seal 10 with the electrical conducting insert 38. Accordingly, similar reference numbers are used as FIGS. 1A-1F and FIG. 2. The electrical conducting insert 38 includes the first interface member 28, the second interface member 30, and the conducting member 36. As shown in FIG. 3, the first interface member 28 is connected to the first end 14 of the through-hole connector 12, the second interface member 30 is connected to the second end 16 of the through-hole connector 12, and the conducting member 36 electrically connects the first interface member 28 to the second interface member 30.

The electrical conducting insert 38 provides electrical continuity through a barrier 40 from the first side 42 of the barrier 40 to a second side 44 of the barrier 40. A first conduit can be connected to the first end 32 of the conduit seal 10, and a second conduit can be connected to the second end 34 of the conduit seal 10. The electrical conducting insert 38 enables electrical continuity between the first conduit connected to the first end 32 and the second conduit connected to the second end 34. The first conduit and second conduit can be a variety of shapes, sizes, and materials depending on the application. For example, the first conduit and second conduit can be a cord as well as flexible or rigid.

The barrier 40 can take a variety of forms. In some examples, the barrier 40 is a floor or a wall (e.g., a floor or a wall in a building). When the barrier 40 is a floor (e.g., a floor in a building), the first side 42 of the barrier 40 can be above or below the second side 44 of the barrier 40. That is, the first side 42 of the barrier 40 can be located vertically above the second side 44 of the barrier 40; alternatively, the second side 44 of the barrier 40 can be located vertically above the first side 42 of the barrier 40. When the barrier 40 is a wall (e.g., a wall in a building), the first side 42 of the barrier 40 can be located horizontally across from the second side 44 of the barrier 40. These examples of the barrier 40 are not exhaustive and meant to be exemplary only.

Depending on conditions of the environment, it may be more beneficial to have the locking member 26 may be on the first side 42 or the second side 44. For example, having the locking member 26 be located vertically below the flange 20 may make installation easier. That way, a user can extend the conduit seal 10 through the barrier 40 while keeping the flange 20 on the above floor side. The flange 20 will keep the conduit seal 10 from sliding through the hole of the barrier 40. The user can then go down to the floor below and connect the locking member 26 to the connecting means 18 of the conduit seal.

In contrast, if the conduit seal 10 was pushed through a hole in the barrier 40 while maintaining the flange 20 on the below floor side, the conduit seal 10 may fall out of the hole because the flange 20 was not able to support the conduit seal 10. This example is similar to the depiction shown in FIG. 3 where the barrier 40 is a floor/ceiling of a building.

The barrier 40 can be any form or shape that divides the first side 42 of the barrier 40 from the second side 44 of the barrier 40. For example, the barrier 40 can be an insulation panel. In addition, the first side 42 and the second side 44 can be positioned in any relation to one another: side by side; and above and below (and vice versa). Depending on the application, it may be beneficial to have the locking member 26 on the first side 42 or second side 44 of the barrier 40.

The electrical conducting insert 38 provides for electrical continuity between the first side 42 and the second side 44. The electrical conducting insert 38 extends longitudinally within the internal cavity 48 along the through-hole connector 12 to electrically connect the first end 14 of the through-hole connector 12 to the second end 16 of the through-hole connector 12. In some examples, the electrical conducting insert 38 can include more than one conducting member 36. In some examples, the conducting member 36 does not extend substantially parallel to a longitudinal centerline of the through-hole connector 12. Instead, the conducting member 36 can be helical or have a non-axial orientation, which may increase thermal resistance.

In some examples, the first interface member 28 has a threaded portion and is configured to be connected to a separate conduit. Similarly, the second interface member 30 has a threaded portion and is configured to be connected to a second, separate conduit. In some examples, the interface members 28 and 30 are threadless instead of having threaded fittings.

The conduit seal 10 can be made with a variety of materials according to application requirements, including: polymers, reinforced polymers, such as with additives, FDA approved materials and fire-resistant polymers. For example, fiber reinforced polymers can be used to achieve desired mechanical stiffness. FDA-approved polymers can be used for F&B applications. Intumescent material can be adopted if the conduit seal 10 application demands fire code compliance. In some examples, the intumescent material will expand and form carbonized porous foam when exposed to fire to seal the through hole and subsequently stop fire penetration from the first side 42 to the second side 44 of the barrier 40. When the conduit seal 10 is a foamed polymer, the conduit seal 10 can have enhanced thermal resistance.

In some examples, the conduit seal 10 can be made of a single material. Alternatively, some components of the device can be made of different materials. For example, the through-hole connector 12 and the interface members 28 and 30 can be made of a different material than one another. In some embodiments, the conduit seal 10 is injection molded via thermoplastic materials, compression (compression or transfer molding) molded via thermoset materials or potted. The present disclosure provides for the conduit seal 10 to include materials such as thermosetting plastics, silicone rubber gels, or epoxy resins. The conduit seal 10, including the through-hole connector 12, can be made with polymers through a variety of methods such as injection molding, compression molding, transfer molding, or potting.

Examples of thermoplastic materials that may be used include one or more polymer composite materials, including but not limited to polyolefins, such as polypropylene, polyethylene, low density polyethylene, high density polyethylene, acetal and ketal based polymers and copolymers, polyesters (e.g. polyethylene terephthalate, polybutylene terephthalate), polycarbonate, polystyrene, polyether sulfone (PESU), polyphenylene sulfone (PPSU), polysulfone, and polytetrafluoroethylene (PTFE). Other polymers can also be implemented, including but not limited to polyvinyl chloride (PVC), polyetherimide (PEI), polyphenylene sulfide (PPS), polyether ether ketone (PEEK), polyphthalamide (PPA), polyoxymethylene (POM), phenol-formaldehyd (PF), unsaturated polyester (UP), polyurethane (PUR and PU), polyimide, polyamide, polyvinyl alcohol, polyvinylidene chloride, polyacrylonitrile and polyalkylene paraoxybenzoate. Engineered polymeric materials can be used such as reinforced polymer materials and fire-resistant polymers including intumescent polymers.

Examples of thermoset materials include but are not limited to epoxies, polyester, such as polyester bulk molding compounds (BMC), and phenolics. Rubbers, such as nitrile rubbers, butyl rubbers, neoprene, EPDM rubber (ethylene propylene diene monomer rubber), and silicone can also be used. The thermoset materials, including rubbers, can be used in a potted process. For example, the thermoset materials can be used in a potting process to encapsulate the interface members 28 and 30.

In some embodiments, the material of the conduit seal 10 can include a variety of types of fibers, including but not limited to carbon fiber, glass fiber, wool, silk, cotton, rayon, cellulose, cellulose acetate, flax, ramie, jute and aramid fibers. For example, the conduit seal 10 can be made of a polymeric composite with wool.

In some embodiments, additives can be added to the materials of the conduit seal 10 to improve the qualities of the materials, including but not limited to the ultra-violet (UV) resistance, antimicrobial, conductivity, mechanical and thermal stability, chemical resistance, insulation property and decreased flammability. The additives can include, but are not limited to, ceramics, alumina, calcium silicate, flame retardants, expandable graphite and clays. Blowing agents can also be added to the formulation to achieve foaming structures. Possible blowing agents may be ammonium polyphosphate, melamine phosphate, urea, urea-formaldehyde resins, dicyandiamide, melamine or glycine. The additives may be in the range of 0% to 50%, or any intervening number or a smaller range within 0% to 50%, by mass in the conduit seal 10. For example, the additives in the conduit seal 10 may be about 12% by mass or from about 15% to about 25%.

The conduit seal 10 may need to be rigid or flexible depending on the shape of the barrier 40 and environmental conditions. In some examples, the conduit seal 10 can have a durometer range of about 40 Shore A to about 100 Shore A, or any intervening number. For example, the conduit seal 10 can have a durometer range of about 40 Shore A to about 90 Shore A.

The conduit seal 10 may have a variety of shapes and sizes, depending on the barrier 40, to achieve a proper seal. Although the cross-sectional shape of the conduit seal 10 is shown as cylindrical, other geometries (e.g., triangular or hexagonal) may be used. The geometry of the conduit seal 10 may be symmetrical or non-symmetrical. The exterior surface of the conduit seal 10 can be smooth or textured (e.g., corrugated). In some examples, such as in the F&B industry, it may be advantageous to have a smooth exterior. The shape and size of the conduit seal 10 can be selected based on the shape and size of the space of the barrier 40 that the conduit seal 10 is extending through. For example, if the length of the space of the barrier 40 is long, the conduit seal 10 will also need to be long. If the cross-sectional shape of the space of the barrier 40 is small, the conduit seal 10 will also need to be small. Components of the conduit seal 10 may have different sizes and/or geometries from one another. For example, the interface members 28 and 30 may have a circular cross-sectional shape, and the body 46 may have a square cross-sectional shape. The interface members 28 and 30 may have different cross-sectional shapes or sizes depending on the conduit that they are being connected to. As an example, the interface members 28 and 30 may both have a circular cross-sectional shape, but the first interface member 28 may be smaller than the second interface member 30 to connect to a smaller conduit.

The conduit seal 10, particularly the through-hole connector 12 and the locking member 26, can have a low thermal conductivity. By having the conduit seal 10 be made of a material of low thermal conductivity, the heat leak or gain across a change in environment can be prevented or reduced. In turn, this may reduce HVAC demands for the environment and also prevent or reduce the issue of condensation, as previously described. The conduit seal 10, including the through-hole connector 12, can have a thermal conductivity ranging from about 0.2 Watt per meter-Kelvin to about 5 Watt per meter-Kelvin, or any intervening number. For example, the conduit seal 10 can have a thermal conductivity ranging from about 1 Watt per meter-Kelvin to about 3 Watt per meter-Kelvin, or about 0.5 Watt per meter-Kelvin.

The first interface member 28 and the second interface member 30 (collectively referred to as the interface members 28 and 30) can be made of a variety of materials. In some examples, the interface members 28 and 30 are made of a conductive material or include a conductive material, such as a metallic material. Conductive materials include galvanized steel, stainless steel (304 or 316), aluminum, or red brass. In some examples, the interface members 28 and 30 may be made primarily of a non-conductive material and then include a conductive material so that the interface members 28 and 30 as a whole are sufficiently conductive.

Similar to the interface members 28 and 30, the conducting member 36 can be made of a variety of materials. The conducting member 36 can be made of or at least include a conductive material. In some examples, the conductive material includes copper, aluminum, or stainless steel. The conducting member 36 and the interface members 28 and 30 can be made of the same or substantially similar material. Alternatively, the conducting member 36 and the interface members 28 and 30 can be of a different material.

The first compliant member 22 and the second compliant member 24 (collectively referred to as the compliant members 22 and 24) can be made of a variety of materials. In some examples, the compliant members 22 and 24 are elastomeric, and elastomeric sealing is designed to provide superior and durable sealing to a structure. In some examples, the compliant members may not be needed when enhanced sealing to a structure is not required. Elastomeric materials include polyisoprene, polybutadiene (butadiene rubber), styrene-butadiene rubber, acrylonitrile-butadiene copolymer, isobutylene-isoprene copolymer, ethylene-propylene copolymer, polychloroprene, polysulfide, silicones (e.g., polydimethylsiloxane), polyurethane, polyacrylate elastomer, chlorinated polyethylene, styrene-isoprene-styrene copolymer (SIS), styrene-butadiene-styrene copolymer (SBS), ethylene-propylene-diene polymer, fluoroelastomers (e.g., tetrafluoroethylene propylene, fluorosilicone, and perfluoroelastomer), or any combination thereof.

The conduit seal 10 can be assembled and manufactured through a variety of methods. The interface members 28 and 30 can be over-molded at each end of the through-hole connector 12. The interface members 28 and 30 (e.g., over-molded metallic interfaces) can be a common conduit coupler or nipple, and electrically bonded with the conducting member 36 (e.g., a bonding conductor). The interface members 28 and 30 can have standard interface design (e.g., a National Pipe Taper (NPT) interface) so that the conduit seal 10 can be widely used on pipes and fittings.

When installing the conduit seal 10, the through-hole connector 12 can be inserted into the barrier 40 (e.g., the insulation wall, ceilings or insulation panels), and then the compliant members 22 and 24 (e.g., elastomer washers) are utilized on the flange 20 and the locking member 26 (e.g., a flange) to provide superior and durable sealing. Conduits can then be installed at the first end 14 and second end 16 of the through-hole connector 12. In some examples, the locking member 26 can be a molded threaded locking cap to mechanically fix the conduit seal 10 to the barrier 40 (i.e., the structure the conduit seal 10 is intended to penetrate).

The electrical conducting insert 38 can be over-molded via injection molding, compression molding, transfer molding, or potting. In manufacturing the conduit seal 10, the electrical conducting insert 38 can be placed inside a mold, followed by molten polymer filling the cavity, encapsulating the electrical conducting insert 38 and forming the final geometry in one step. By changing the electrical conducting insert 38 (such as size, shapes and materials of the electrical conducting insert 38), it is feasible to achieve multiple trade sizes in a single mold, reducing production cost. Manufacturing the conduit seal 10 can also incorporate scalable manufacturing (with limited capital expenditures) and automated production methods (e.g., for over-molding manufacturing). The electrical conducting insert 38 can also be added or installed after molding process via mechanical attachment or welding to the distinctive metallic components.

FIG. 4 shows an exemplary flowchart according to some of the embodiments for securing a conduit seal to a barrier. The conduit seal can be any of the embodiments as described herein. The method 100 includes inserting 102 a first end of a through-hole connector through the barrier to a first side of the barrier. The method further includes maintaining 104 a flange connected to a second end of the through-hole connector on a second side of the barrier. The method also includes sealing 106 the through-hole connector to the barrier by connecting a first compliant member connected to a locking member to the first side of the barrier and connecting a second compliant member connected to the flange to the second side of the barrier. In some examples, the locking member has a threaded interior surface and the first end of the through-hole connector has a threaded exterior surface, and the threaded interior surface of the locking member and the threaded exterior surface of the first end of the through-hole connector are reciprocally threaded. Connecting the first compliant member to the first side of the barrier can include screwing the threaded interior surface of the locking member onto the threaded exterior surface of the first end of the through-hole connector.

The terminology used herein is intended to describe embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

It is to be understood that changes may be made in detail, especially in matters of the construction materials employed and the shape, size, and arrangement of parts without departing from the scope of the present disclosure. This Specification and the embodiments described are examples, with the true scope and spirit of the disclosure being indicated by the claims that follow.

What is claimed is:

1. A conduit seal, comprising:
   a through-hole connector,
   wherein the through-hole connector includes:
   a body,
   wherein the body has an exterior surface,
   wherein the body defines an internal cavity,
   a first end, and
   a second end,
   wherein the second end is longitudinally opposite the first end;
   a compliant member,
   wherein the compliant member is disposed circumferentially around the exterior surface of the through-hole connector;
   a locking member,
   wherein the compliant member is connected to the locking member and is configured to seal the locking member to a barrier; and
   at least one electrical conducting insert comprising:
   a first interface member connected to the first end of the through-hole connector, the first interface member configured to connect to a first, separate conduit,
   a second interface member connected to the second end of the through-hole connector, the second interface member configured to connect to a second, separate conduit, and
   a conducting member electrically connecting the first interface member to the second interface member,
   wherein the at least one electrical conducting insert is located within the internal cavity defined by the body, and wherein the at least one electrical conducting insert extends longitudinally within the internal cavity along the through-hole connector to electrically connect the first end of the through-hole connector to the second end of the through-hole connector,
   wherein the first interface member has a first threaded portion and the second interface member has a second threaded portion.

2. The conduit seal of claim 1,
   further comprising a second compliant member,
   wherein the second compliant member is disposed circumferentially around the exterior surface of the through-hole connector.

3. The conduit seal of claim 2,
   wherein the second end of the through-hole connector comprises a flange, and
   wherein the second compliant member is connected to the flange and is configured to seal the flange to the barrier.

4. The conduit seal of claim 2,
   wherein the compliant member and the second compliant member are elastomeric.

5. The conduit seal of claim 2,
   wherein the compliant member and the second compliant member comprise polyisoprene, polybutadiene (butadiene rubber), styrene-butadiene rubber, acrylonitrile-butadiene copolymer, isobutylene-isoprene copolymer, ethylene-propylene copolymer, polychloroprene, polysulfide, silicones, polyurethane, polyacrylate elastomer, chlorinated polyethylene, styrene-isoprene-styrene copolymer (SIS), styrene-butadiene-styrene copolymer (SBS), ethylene-propylene-diene polymer, fluoroelastomers, or any combination thereof.

6. The conduit seal of claim 1,
wherein the first threaded portion of the first interface member is configured to be connected to the first, separate conduit, and
wherein the second threaded portion of the second interface member is configured to be connected to the second, separate conduit.

7. The conduit seal of claim 1,
wherein the first interface member and the second interface member comprise a metallic material.

8. The conduit seal of claim 1,
wherein the conducting member comprises copper, aluminum, or stainless steel.

9. The conduit seal of claim 1,
wherein the through-hole connector is injection molded, compression molded, transfer molded, or potted.

10. The conduit seal of claim 1,
wherein the through-hole connector comprises a thermoplastic or a thermoset resin.

11. The conduit seal of claim 1,
wherein the through-hole connector comprises an additive of ultra-violet (UV) resistance, antimicrobial, conductivity, mechanical and thermal stability, chemical resistance, insulation property or decreased flammability.

12. The conduit seal of claim 1,
wherein a thermal conductivity of the through-hole connector ranges from about 0.2 Watt per meter-Kelvin to about 5 Watt per meter-Kelvin.

13. A method of securing a conduit seal to a barrier, comprising:
inserting a first end of a body of a through-hole connector through the barrier to a first side of the barrier;
maintaining a flange connected to a second end of the body of the through-hole connector on a second side of the barrier;
sealing the through-hole connector to the barrier by connecting a first compliant member connected to a locking member to the first side of the barrier and connecting a second compliant member connected to the flange to the second side of the barrier,
wherein the through-hole connector comprises at least one electrical conducting insert comprising:
a first interface member connected to the first end of the through-hole connector, the first interface member configured to connect to a first, separate conduit,
a second interface member connected to the second end of the through-hole connector, the second interface member configured to connect to a second, separate conduit, and
a conducting member electrically connecting the first interface member to the second interface member,
wherein the at least one electrical conducting insert is located within an internal cavity defined by the body, and wherein the at least one electrical conducting insert extends longitudinally within the internal cavity along the through-hole connector to electrically connect the first end of the through-hole connector to the second end of the through-hole connector,
wherein the first interface member has a first threaded portion and the second interface member has a second threaded portion.

14. The method of securing the conduit seal to the barrier of claim 13,
wherein the barrier is a floor in a building, and wherein the first side of the barrier is located vertically above the second side of the barrier.

15. The method of securing the conduit seal to the barrier of claim 13,
wherein the barrier is a floor in a building, and wherein the second side of the barrier is located vertically above the first side of the barrier.

16. The method of securing the conduit seal to the barrier of claim 13,
wherein the barrier is a wall in a building.

17. The method of securing the conduit seal to the barrier of claim 13,
wherein the locking member has a threaded interior surface and the first end of the through-hole connector has a threaded exterior surface,
wherein the threaded interior surface of the locking member and the threaded exterior surface of the first end of the through-hole connector are reciprocally threaded, and
wherein connecting the first compliant member to the first side of the barrier comprises screwing the threaded interior surface of the locking member onto the threaded exterior surface of the first end of the through-hole connector.

18. The method of securing the conduit seal to the barrier of claim 13,
further comprising connecting a first conduit to a first end of the conduit seal.

19. The method of securing the conduit seal to the barrier of claim 13,
further comprising connecting a second conduit to a second end of the conduit seal.

* * * * *